Feb. 1, 1966 A. K. JENSEN 3,233,118

MISSING PULSE AND BUSY SIGNAL CONTROL CIRCUIT

Filed Oct. 25, 1961 2 Sheets-Sheet 1

INVENTOR.
ALAN K. JENSEN

BY Charles L. Johnson Jr.

ATTORNEY

MISING PULSE AND BUSY SIGNAL CONTROL CIRCUIT

Filed Oct. 25, 1961

INVENTOR.
ALAN K. JENSEN
BY Charles L. Johnson Jr.
ATTORNEY

United States Patent Office
3,233,118
Patented Feb. 1, 1966

3,233,118
MISSING PULSE AND BUSY SIGNAL CONTROL CIRCUIT

Alan K. Jensen, Dover, N.J., assignor to Monroe International Corporation, a corporation of Delaware Filed Oct. 25, 1961, Ser. No. 147,592
5 Claims. (Cl. 307—88.5)

This invention relates generally to control circuits and more particularly to electronic circuits for generating signals indicative of the operative state of a monitored device.

In data processing systems numerous devices transmit to and receive information from other devices. Limitations in the speed or amount of information that may be handled by the receiving device requires that a "busy" signal be generated when no further information may be consumed. This signal may then control the supplying device. A problem which arises in the control of one device or machine is the ambiguous signals which arise due to switch or contact bounce. In order to prevent these false signals from erroneously controlling the operation of machines an antibounce delay circuit is of great importance. It is to the solution of these problems that the present invention is directed.

Previous attempts to solve these problems have often resulted in the use of one-shot multivibrators. Normal one-shot multivibrators however require that the multivibrator run-down or reset before the delay period may be reinitiated. In the present invention the delay can be completely reinitiated at any time. When using a one-shot multivibrator for the "busy" signal aplication the one-shot period must be made long enough to cover the longest case of contact bounce which is expected to be encountered. The result is wasted time if the device does not display the anticipated amount of contact bounce.

Another common problem in certain electronic endeavors is the determination of the point in time when a repetitive signal recurs at a lower rate than some desired frequency. The present invention is also directed to providing such a minimum frequency detector.

Many other applications should be noted for the invention, one outstanding use being directed to the determination of missing pulses from a pulse train.

It is therefore an object of this invention to provide an improved control circuit.

It is a further object of the invention to provide a control circuit for generating a "busy" signal for control of transmitted information to readout devices.

It is a further object of the invention to provide a control circuit including a circuit for automatically reinitiating a delay upon the occurrence of random or contact bounce signals.

It is a still further object of the invention to provide an improved minimum frequency detector.

A still further object of the invention is to provide apparatus for detecting omitted pulses from a train of signals or pulses.

Figure 1:
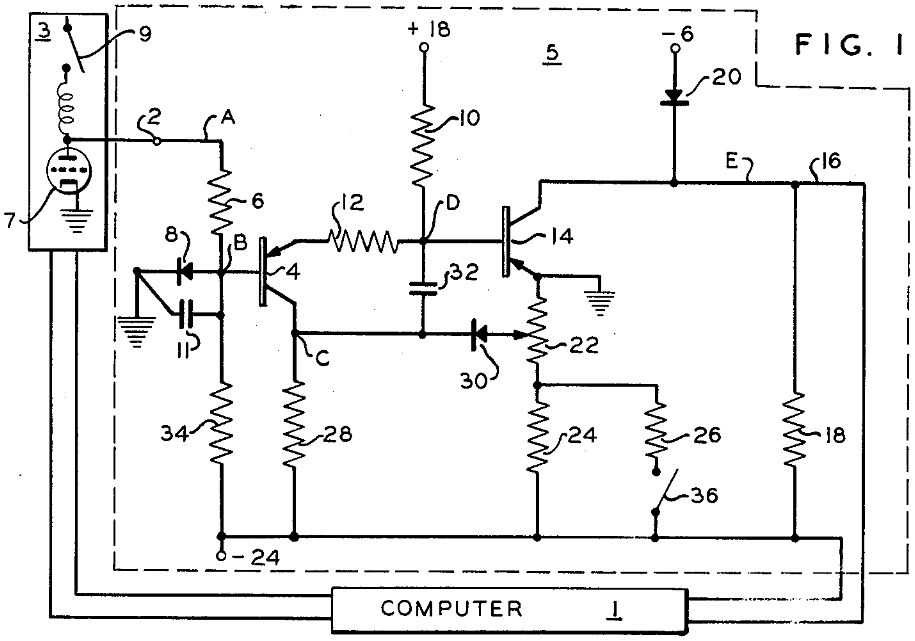

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

FIG. 1 is a partial schematic of the invention utilized as a "busy" signal generator.

Figure 2:
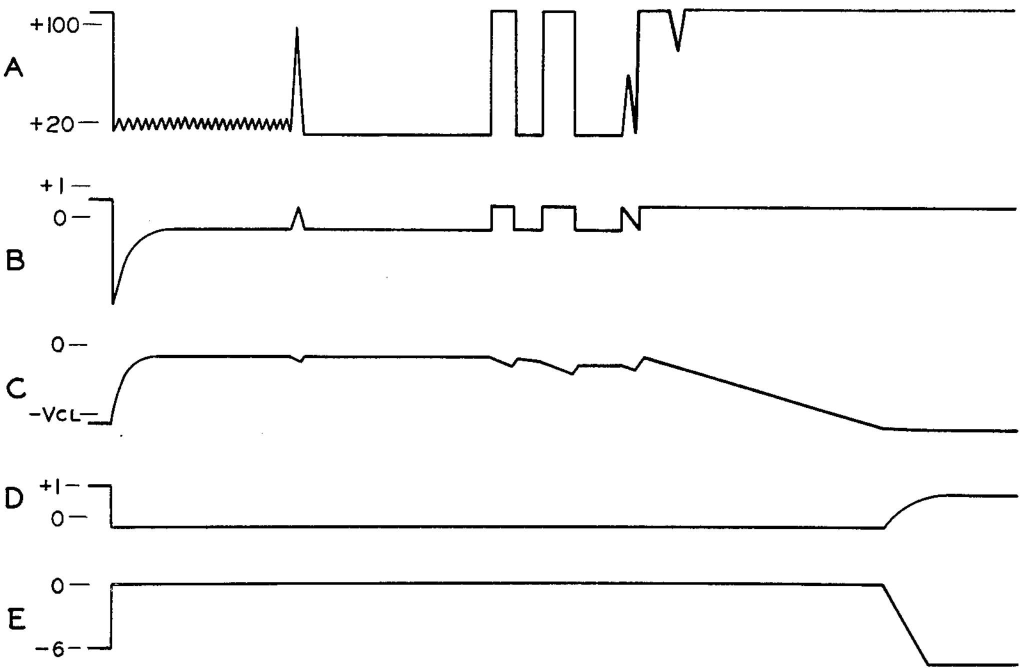

FIG. 2 denotes the voltage waveforms at points designated in FIG. 1.

Figure 3:
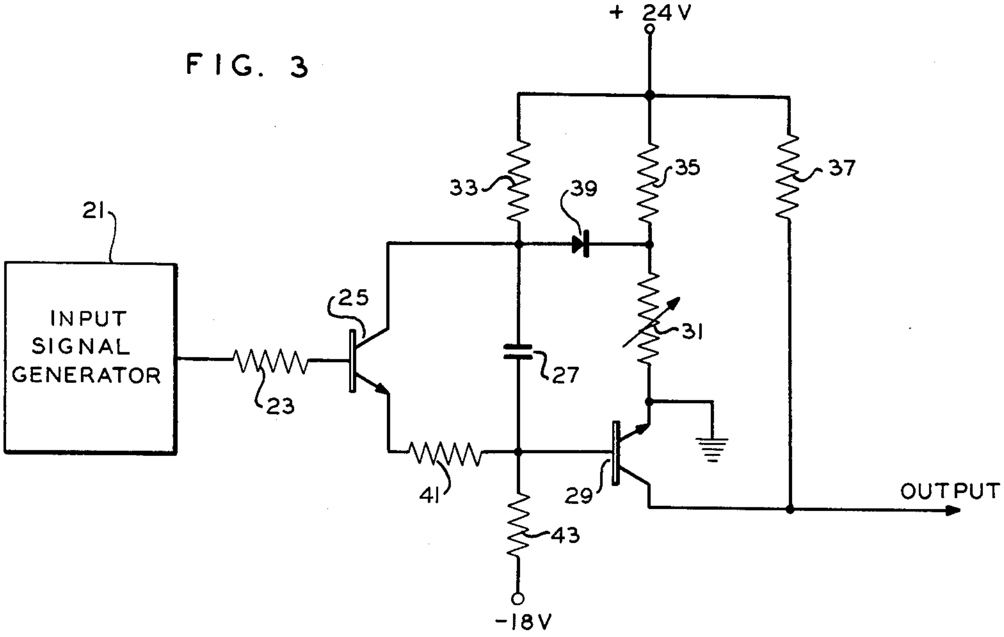
Figure 4:
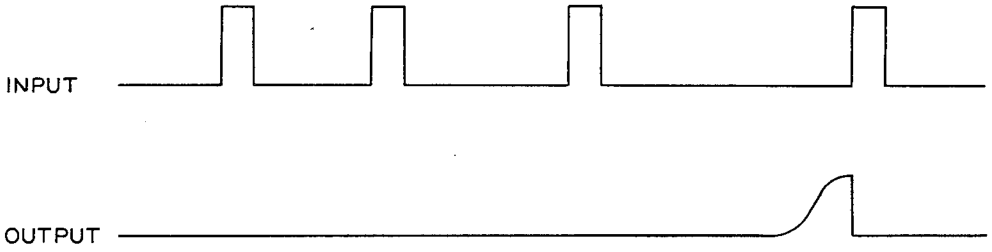

FIG. 3 is a schematic of the invention utilized as a minimum frequency detector and, FIG. 4 shows the input and output waveforms of FIG. 3.

The preferred embodiment of this invention provides a control circuit for generating an output or control signal upon the happening of such an event as a monitored machine being "busy" and therefore unable to accept more input information at that time. A delay is incorporated to prevent erroneous contact bounce indications from controlling the apparatus. The above is accomplished by arranging a clamp voltage source, a capacitor and input and output transistor switches so that the capacitor is normally charged during the "not busy" period but is discharged whenever the input drops below a given value thereby switching the output transistor to provide a "busy" output signal until such time as the input remains in the "not busy" condition long enough for the capacitor to charge to the clamp voltage. At such time the output transistor ceases conduction causing the output to signal "not busy." Thus a "busy" signal has been generated for the period the monitored device is busy, during any erroneous contact bounce signals and for a short period thereafter.

In a second emobdiment, as a minimum frequency detector, a capacitor is charged toward a clamp voltage between pulses of a train so that if the frequency decreases or a pulse in missing the capacitor will charge to the clamp potential thereby switching the output transistor to generate a signal indicating decreased frequency or missing pulse.

In the following detailed description of the apparatus by which the objects of the invention are realized it should be noted that the values given are for one embodiment of the invention and that numerous variations may be made without departing from the spirit of the invention.

Referring now to FIG. 1, the operation of the circuit will be described with reference to the resultant waveforms illustrated in FIG. 2 and indicated as the waveforms present at points A, B, C, D, and E of FIG. 1.

FIG. 1 is a partial schematic of the control circuit when used as a "busy" signal generator. In FIG. 1 a computer 1 is interconnected between an output device 3 and the control circuit 5. The computer may be considered as one example of an apparatus for handling information while the output device may be considered using apparatus. The computer 1 may be any of several well-known commercial types. The output device 3 may be any one of the well-known types and for purposes of example may be a typewriter. In the output device 3, by way of example, is shown an output thyratron 7 and plate switch 9 which operates in accordance with the condition of the output device. When the output device 3 is not busy the switch 9 is closed applying plate voltage to the thyratron 7. Upon receipt of input information from the computer 1, a potential is applied to the grid of the thyratron causing it to conduct. The input terminal 2 is normally connected to the plate of the thyratron tube associated with the common solenoid of the input or output device or to some other variable potential which is representative of the operative state of the device being monitored. In the preferred embodiment, as shown in FIG 1, the signal obtained at terminal 2 is approximately 100 to 150 volts in amplitude when the monitored device is not busy and is relatively low, less than 20 volts when the device is busy. When transferring from the "busy" to "not busy" conditions there may be a period of ambiguity caused by bouncing of mechanical contacts in the device. The purpose of this circuit, when used as a "busy" signal generator is to continue a firm "busy" output indication throughout this period of uncertainty as well as to transform the signal obtained on the input into a low impedance source form suitable for driving computer logic circuits.

When the monitored device 3 is not busy the base of transistor 4, which may be considered an input switch member, is held at approximately 0.5 volt due to the high voltage input supplying sufficient current through impedance 6 to allow diode 8 to conduct. The emitter of transistor 4 is at a potential of approximately 0.7 volt due to the forward current supplied by impedance 10 by way of impedance 12. The resultant positive base potential holds transistor 14 off. Transistor 14 may be considered an output switch member. With transistor 14 off the output conductor 16 is clamped to its low potential level of −6.0 volts due to the impedance 18 and the diode 20. The variable impedance 22 together with impedances 24 and 26 form a variable clamp potential source for the collector of transistor 4. Impedance 28 is chosen to require sufficient current to force diode 30 to conduct for any value of the variable clamp supply. It should be noted that transistor 4 is not off but that the emitter current supply is insufficient to meet the requirements of impedance 28. While in this condition a charge exists on capacitor 32. Point D is at approximately +0.735 volt while the terminal of the capacitor 32 remote from point D is held at a voltage which is approximately equal to the variable clamp voltage.

When the thyratron fires, indicating that the monitored device is busy, the input potential at terminal 2 drops to below 20 volts and the voltage at point B drops to a negative value. Diode 8 becomes cut off as the base of transistor 4 drops below ground potential and the base current to transistor 4 increases. Inasmuch as impedance 10 cannot fill the needs of impedance 34, the bases of transistors 4 and 14 continue to move negative until transistor 14 conducts and supplies a fixed voltage source for the emitter of transistor 4. This occurs due to the emitter-base action of transistor 14 acting as a diode. The turning on or conduction of transistor 14 raises the output potential at conductor 16 to ground potential to thereby indicate that the monitored device is busy.

The base drive to transistor 14 is equal to the sum of the currents in impedances 28 and 34, less the current in impedance 10.

In addition to the D.C. current in transistor 4 due to impedances 28 and 34, there is a circulating transient current through capacitance 32, impedance 12 and transistor 4. This current serves to rapidly discharge capacitance 32 and flows independent of the D.C. current. The magnitude of this discharge current is dependent on the current gain of transistor 4 and therefore must be limited. This is accomplished by impedance 12.

When the capacitance 32 is completely discharged, the current in transistor 4 returns to the D.C. value determined by impedances 28 and 34 and the circuit remains in this condition so long as the monitored device is busy.

It should be noted that the output was initiated essentially instantaneously. Because the D.C. current in transistor 4 is independent of the transient discharge of capacitance 32, transistor 14 is turned on as soon as the input drops below approximately 20 volts, and remains on throughout and after the discharge period.

When the monitored device becomes idle, the input voltage will rise to greater than 100 volts and the resultant current in impedance 6 again provides clamping of the transistor 4 base to a slightly positive potential due to the diode 8. The capacitance 11 provides a shunt for the leading edge of the positive going signal so as to provide the transistor 4 time to turn off without allowing the pulse to be inadvertently transmitted on through to the output. The base of transistor 14, however, does not rise immediately since the current required by impedance 28 is greater than that supplied by impedance 10. This excess current requirement of impedance 28 must be filled by the base of transistor 14, since capacitance 32 is discharged and diode 30 is biased to a nonconducting condition. Transistor 4 is biased off and the current in impedance 28 provides charging of capacitance 32. Base current will continue to flow in transistor 14 until the charge on capacitance 32 exceeds the variable clamp supply and diode 30 turns on. Impedance 28 will then obtain current from the clamp, reducing the current through capacitance 32 so that the current in impedance 10 will charge the base of transistor 14 positive until transistor 4 conducts. Transistor 14 turns off at this point and the output is free to drop to −6.0 volts indicating that the monitored device is not busy. Once again the current through impedance 10 flows through transistor 4 and the circuit is restored to its initial state.

The delay then, from the time the input returns positive until the output signals "not busy," is basically proportional to the time required for the charge on capacitance 32 to reach the variable clamp supply. The delay, therefore, is adjustable by varying the value of impedance 22. It is thus seen that the supply potentials may vary considerably without adversely affecting the circuit operation.

A second adjustment may be made by closing switch 36. When this switch is closed the initial delay set by impedance 22 may be altered and by using the preferred embodiment values the delay may be approximately doubled. This feature may be utilized on those devices which display excessive contact bounce. The closing of the switch may be accomplished manually or automatically.

It should be noted that throughout the contact bounce, each time the input signal drops below 20 volts, a portion of the charge on capacitance 32 is destroyed, the amount destroyed depending upon the length of time the input remains low. In the circuit shown, if the input remains low for greater than 2.5 milliseconds, capacitance 32 will be completely discharged and the delay will be completely reinitiated. This automatic reinitiation of the delay period is an important feature of the invention. Also it should be noted that throughout the bounce, whether capacitance 32 is being charged or discharged, the output remains high indicating the monitored device is busy. The output, therefore, will remain high for at least the delay period selected after the last low input exceeding 2.5 milliseconds.

As noted previously, typical waveforms for a complete cycle of the circuit appear in FIG. 2. Each of the five waveforms A–E indicate the waveform appearing at the corresponding points A–E of the FIG. 1 circuit.

In the preferred embodiment of FIG. 1, the following values are typical with the impedances in thousands of ohms and the capacitances in microfarads:

| Reference numeral: | Value or type |
|---|---|
| 4 | 2N412 |
| 6 | 39 |
| 8 | 1N636 |
| 10 | 51 |
| 11 | 0.1 |
| 12 | 0.1 |
| 14 | 2N412 |
| 18 | 3.3 |
| 20 | 1N636 |
| 22 | 0.5 |
| 24 | 1.5 |
| 26 | 1.2 |
| 28 | 20 |
| 30 | LD73 |
| 32 | 2 |
| 34 | 15 |

The embodiment of the invention illustrated in FIG. 3 provides a minimum frequency detector circuit. The operation is similar to that of FIG. 1 except that NPN type transistors are utilized to provide discharging for the capacitor during input pulses and charging between input pulses so that if an input pulse is missing or delayed because of a change to a lower frequency the capacitor will charge to the clamp voltage value and cause the output transistor to switch off allowing the output potential to rise as shown at the FIG. 4. The occurrence of another pulse at the input will cause the capacitor to discharge and initiate another delay period.

FIG. 3 shows an input signal generator 21 connected to the input transistor 25. The capacitive means 27 charges between pulses and discharges during the input pulses shown in FIG. 4 so as to switch the output transistor when the charge of the capacitance exceeds the clamp voltage set by impedance 31. When the clamp voltage is exceeded the output as shown in FIG. 4 receives a high output signal.

Values of one embodiment of FIG. 3 are listed below with the impedances in thousands of ohms and the capacitance in microfarads.

| Reference numeral: | Value or type |
|---|---|
| 23 | 3 |
| 25 | 2N585 |
| 27 | 0.2 |
| 29 | 2N585 |
| 31 | 11 |
| 33 | 20 |
| 35 | 1 |
| 37 | 10 |
| 39 | HD2205 |
| 41 | 0.1 |
| 43 | 68 |

Thus it is seen that the embodiments of both FIGS. 1 and 3 may be utilized as a "busy" signal generator, minimum frequency detector or missing pulse detector.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. In a data processing system having processing apparatus for handling information and using apparatus for receiving and utilizing information from the processing apparatus, a control circuit interconnected between the using apparatus and the processing apparatus and arranged to receive signals from the using apparatus indicative of the operation or nonoperation of the using apparatus and having an output connected to the said processing apparatus to prevent the transfer of signals from the processing apparatus to the using apparatus when the using apparatus is busy with previously received signals, the said control circuit comprising a first transistor normally biased on, a second normally off transistor and negative potential source arranged so as to provide a control circuit output approximating the negative potential during the time the using apparatus is not busy, capacitive means and clamp means interconnected with the capacitive means and the first and second transistor means whereby a drop in control circuit input potential upon the activation or use of the using apparatus causes the first transistor to increase conduction so as to discharge the capacitive means, causing the second transistor means to conduct and generate an output busy signal until such time as the input not busy potential remains for a period sufficient for the capacitive means to charge to a potential approximating the clamp potential at which time the second transistor ceases conduction and the output signal returns to a level indicating that the using apparatus is not busy, the appearance of this signal at the processing apparatus allowing more information to be transmitted to the using apparatus.

2. A control circuit operative to generate a continuous output signal during and for a given delay time after the end of an input signal, in which the delay period may be reinitiated upon the occurence of another input signal comprising input means including a switch member, output means including a switch member, a conductive path between the input and output switch member, a clamping potential source and normally charged capacitive means coupled between said input and output switch member, said capacitive means responsive to the beginning of an input signal at said input means to be discharged thereby, whereby the leading edge of an input signal switches the input and output switch members so as to immediately commence an output signal at said output means, the capacitive charge to remain discharged until the end of the input signal at said input means, the end of said input signal initiating a delay period by activating the input switch member which in turn causes the output switch member to provide a charging path for the capacitive means to charge toward its initial condition until the capacitive potential exceeds the clamping potential at which time the output switch means operates to alter the output signal, the occurrence of another input signal prior to operation of the output switch causing the capacitive means to be discharged as before and the end of the second input signal acting to reinitiate the delay period so as to extend the output signal until the conclusion of the delay period after the end of the last applied input signal.

3. A control circuit operative during and for a given time after the end of an input signal comprising input means including a first transistor switch member with an input connection to the transistor base, output means including a second transistor switch member having an output connection to the transistor collector, arranged so as to provide an output signal when not conducting, a clamping potential source connected to the first transistor collector and capacitive means having one terminal connected to the clamping potential source and having the other terminal operatively connected between the emitter of the first transistor and the base of the second transistor so that the capacitive means is responsive to the beginning of an input signal to have its charge altered thereby, the charge to remain in its altered state until the end of the input signal activates the first transistor which in turn causes the output transistor to provide a charging path for the capacitive means to charge toward its initial condition until the capacitive potential exceeds the clamping potential at which time the ouput transistor switches OFF to generate an output control signal.

4. Minimum frequency detector apparatus comprising: input means for receiving repetitive input signals; circuit means including an output transistor member arranged to provide a constant output signal during the time the input pulses arrive at the input at or above a given frequency and to generate an altered signal upon a decrease in the input pulse frequency; said output transistor member having a base electrode, a collector electrode and an emitter electrode; said circuit means including clamping potential means, coupled to the emitter electrode of said output transistor member; two terminal capacitive means, a first terminal of said capacitive means being coupled to said clamping potential means and the second terminal of said capacitive means being coupled to the base electrode of said output transistor member; said capacitive means normally charging during the absence of an input pulse and starting to discharge upon the occurrence of and thoughout the duration of each input pulse; said capacitive means charging between input pulses via the path including said base and said emitter electrodes of said output transistor member until the potential at said first terminal of said capacitive means exceeds the clamping potential means at which time the output signal from said output transistor member changes to a value other than said constant output signal to indicate that the input frequency of said repetitive input signals is less than the desired frequency of said repetitive input signals; said clamping potential means being adjustable to prevent the potential at said first terminal of said capacitive means from exceeding the potential of said clamping potential means so long as the frequency of said repetitive input signals remains at or above a desired value.

5. A monitoring circuit for mounting the condition of an associated device, said monitoring circuit producing a first control signal when said associated device is in a first condition and a second control signal when said associated device is in a second condition, said associated device providing a first input signal when in said first condition and a second input signal when in said second condition, comprising: an input transistor switch having a plurality of electrode members; an input terminal for receiving said first and second input signals; first connecting means for coupling said input terminal to one of the electrode members of said input transistor switch; an output transistor switch having a plurality of electrode members; second connecting means for connecting a second electrode member of said input transistor switch to a first electrode member of said output transistor switch; a capacitor coupled between said first electrode member of said output transistor switch and said third electrode member of said input transistor switch, said output transistor switch forming a portion of said capacitor charging path for maintaining the capacitor in charged condition in response to the presence of said first input signals at said input terminal, said output transistor switch producing said first control signal only when said capacitor is fully charged; said input transistor switch providing a discharge path for said capacitor during the presence of said second input signals at said input terminal; bias means; impedance means coupled to said bias means and input transistor switch, said bias means, said impedance means, said input and output transistor switching means, and said second connecting means comprising a D.C. current path permitting said output transistor switch to produce said second control signal simultaneously with commencement of the discharge of the capacitor during the presence of said second input signals; and adjustable delay means coupled to said capacitor whereby the duration of said second control signal is the sum of the duration of the last of said second input signals and the delay caused by the setting of said adjustable delay means.

References Cited by the Examiner

UNITED STATES PATENTS

| | | | |
|---|---|---|---|
| 2,719,226 | 9/1955 | Gordon et al. | 328—120 |
| 2,847,565 | 8/1960 | Clapper | 328—120 |
| 2,959,716 | 11/1960 | Gordon | 317—148.5 |
| 3,035,184 | 5/1962 | Walker et al. | 307—88.5 |
| 3,068,367 | 12/1962 | Brown et al. | 328—120 |

OTHER REFERENCES

Brown: "Transistors A New Class of Relays," pages 70–76, Control Engineering.

DAVID J. GALVIN, *Primary Examiner.*

JOHN W. HUCKERT, ARTHUR GAUSS, *Examiners.*